(No Model.) 3 Sheets—Sheet 1.

J. E. BLACKMORE.
CAMERA SHUTTER.

No. 525,439. Patented Sept. 4, 1894.

Attest:
L. Lee.
Edw. F. Kinsey.

Inventor.
James E. Blackmore
per Crane & Willis, Attys.

(No Model.) 3 Sheets—Sheet 2.

J. E. BLACKMORE.
CAMERA SHUTTER.

No. 525,439. Patented Sept. 4, 1894.

Attest:
L. Lee
Edw. F. Kersey

Inventor.
James E. Blackmore,
per Crane & Miller, Attys.

(No Model.) 3 Sheets—Sheet 3.

J. E. BLACKMORE.
CAMERA SHUTTER.

No. 525,439. Patented Sept. 4, 1894.

Attest:
L. Lee.
Edw. F. Kinsey

Inventor.
James E. Blackmore,
per Crane & Miller, Attys.

UNITED STATES PATENT OFFICE.

JAMES E. BLACKMORE, OF NEWARK, NEW JERSEY, ASSIGNOR TO VICTOR H. EMERSON.

CAMERA-SHUTTER.

SPECIFICATION forming part of Letters Patent No. 525,439, dated September 4, 1894.

Application filed March 17, 1893. Serial No. 466,409. (No model.)

*To all whom it may concern:*

Be it known that I, JAMES E. BLACKMORE, a citizen of the United States, residing at Newark, Essex county, New Jersey, have invented certain new and useful Improvements in Camera-Shutters, fully described and represented in the following specification and the accompanying drawings, forming a part of the same.

This invention relates to a shutter for that class of cameras which are provided with several rows of lenses adapted to be focused each upon the same moving object, the lenses being exposed successively in order to obtain a connected series of pictures of such object through its several changes of form or condition; and the invention consists in a shutter comprising a curtain having a series of apertures arranged diagonally therein, and means for operating the same to expose the different rows of lenses of the camera successively.

Figure 1:
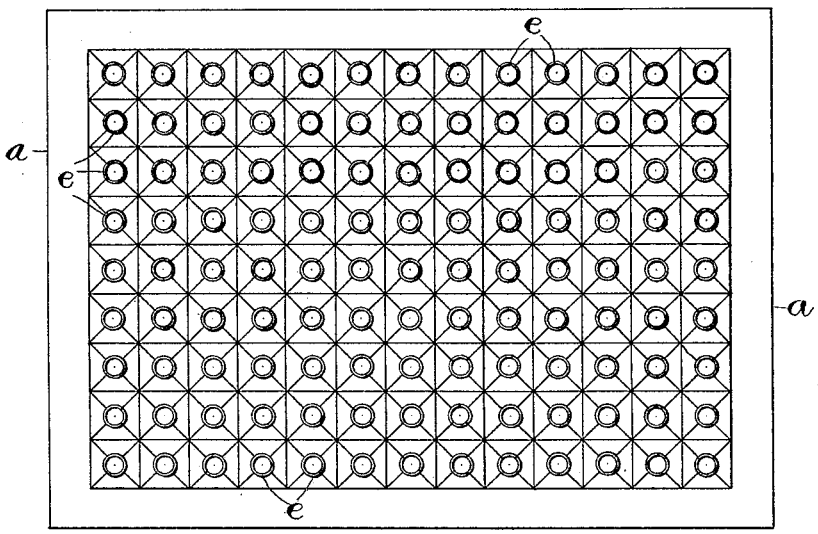
Figure 2:
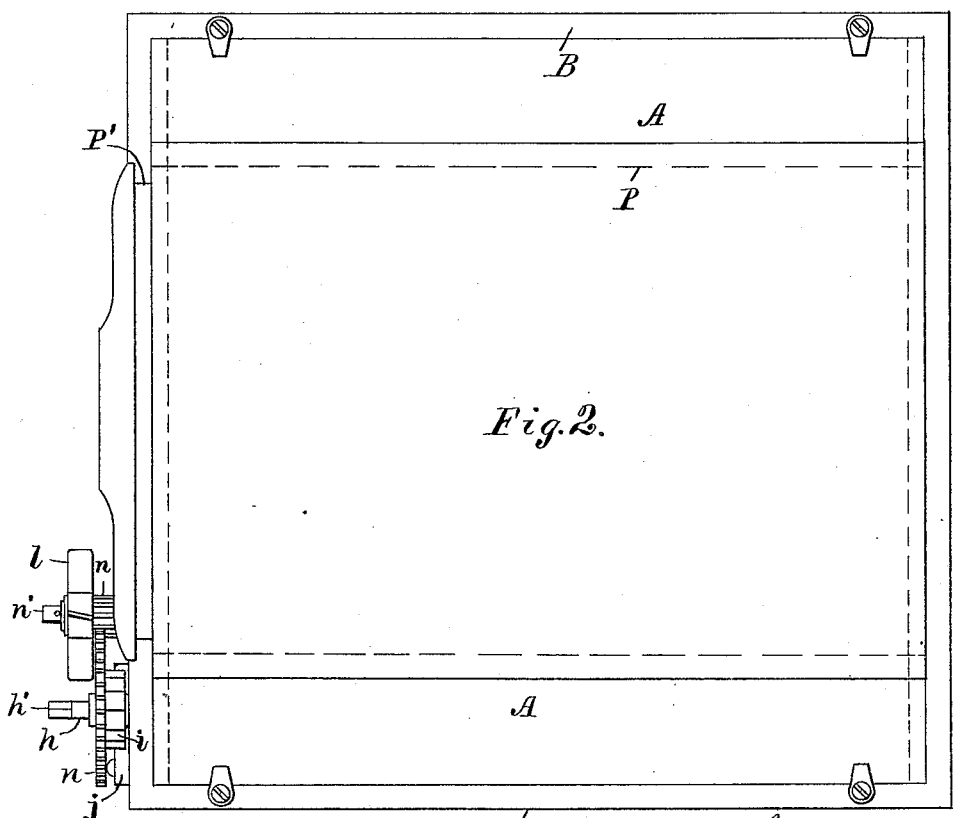
Figure 4:
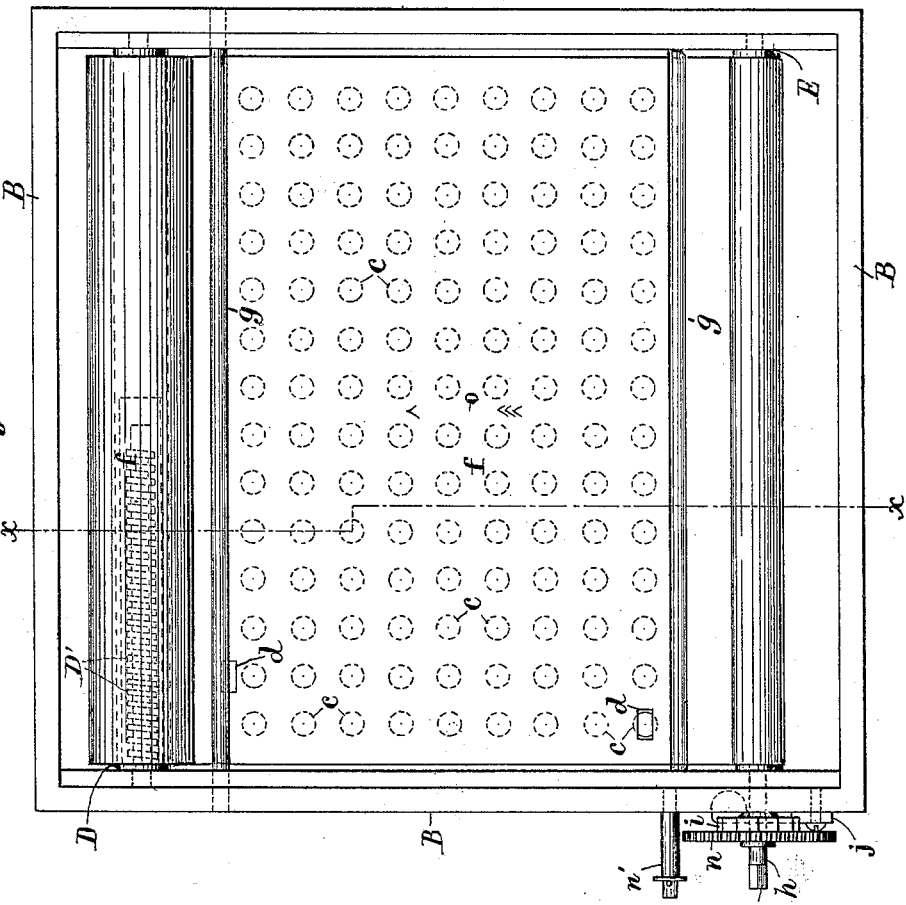
Figure 3:
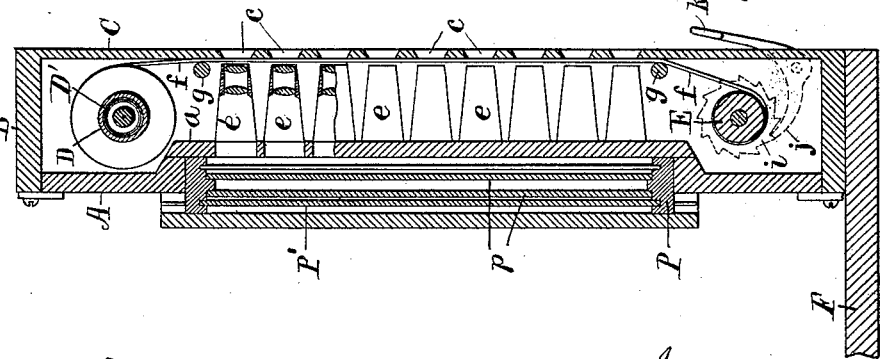
Figure 5:
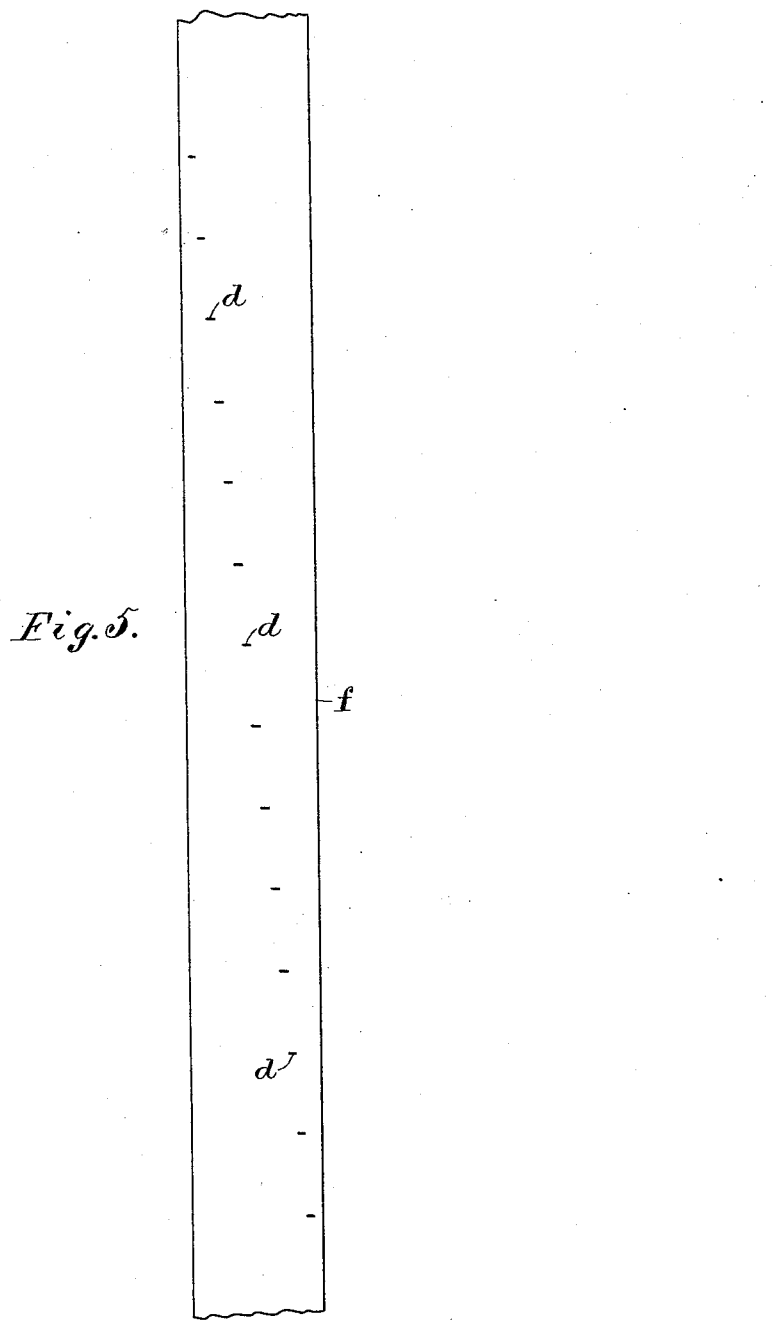

In the drawings a camera is illustrated containing a series of one hundred and twenty-six lenses arranged in thirteen rows of nine each, Figure 1 representing the front side of the lens plate; Fig. 2 the back of the camera with a double plate holder therein; Fig. 3 a cross section on line $x, x$, in Fig. 2; and Fig. 4 an inside view of the curtain box. Fig. 5 is a diagram of the curtain removed from the rolls.

The lens tubes $e$ are mounted upon a lens plate $a$ which is secured to the body A of the camera, upon the back of which a plate holder P is attached by suitable means.

A screen C, mounted before the lenses, is attached to the body A by sides forming a box B, within which a spring curtain-roll D with spring D' and take-up roll E are journaled.

The lens tubes $e$ are arranged in parallel rows of nine each, and the rolls are arranged at right angles to such rows, so that the curtain $f$ attached to such rolls may be drawn over the length of each row; and thus, by means of an aperture in the curtain, expose each lens in the row in turn.

The screen C is provided with a hole $c$ in front of each lens, and a series of apertures $d$ are formed in the curtain as far apart as the outside length of each row.

To uncover thirteen rows in succession, thirteen holes are required in the curtain, and the length of the curtain would be at least thirteen times the length of one row. The apertures $d$ are therefore formed in a diagonal line across the curtain, as shown in Fig. 5, and the curtain is shown in Fig. 4 with all the apertures moved past their respective rows excepting the last aperture, which is shown at the beginning of the last row of lenses. The movement of such aperture to the opposite end of the row would complete the exposure of all the lenses; while a little further movement, as shown in the aperture above the top of the second row, would cover all the lenses by the curtain, to wholly shield the plate from light.

The axle $h$ of the roll E is provided, outside the box B, with a winding squared head $h'$, and a ratchet wheel $i$ having a pawl $j$ provided with a thumb piece $k$. A rotary fan $l$ is connected with the axle $h$ by gears $n$ adapted to rotate the fan at a high rate of speed.

To prepare the camera for use, the curtain is wound wholly upon the take-up roll by applying a crank to the squared head $h'$, the pawl serving to lock the roll, with the curtain wound thereon, until the camera is in position for exposure.

The photographic lenses employed are of suitable focus to produce a proper image upon a sensitized plate in the holder P, and when a series of negatives is desired the camera is provided with a sensitive plate $p$ and presented to a moving object, and the take-up roll is released by pressure upon the thumb piece $k$. The spring roll D then winds up the curtain, in the direction indicated by the arrow $o$ in Fig. 4, at a rate of speed which is controlled by the fan wheel $l$, the latter operating as a regulator to produce the speed desired. The curtain is held against the screen by wire guides $g$.

To secure eighteen negatives in a second, with the apparatus shown, two of the apertures $d$ would be required to move in succession over two rows of the lenses in a second of time, and the speed regulator would be constructed to produce such a movement. When the curtain is wound entirely upon the spring roll D, the exposure is completed, and the last aperture in the curtain would also be drawn from before the last lens in the series, to cover all the lenses and protect them from light, as described above. The slider P' is then pushed into the plate holder, when the plate $p$ could be removed and developed in the usual manner.

A positive containing the same number of pictures may be readily printed from the plate of compound negatives by the usual means, and as all the lenses in one row would be exposed successively before the first lens in the succeeding row was uncovered, it is obvious that the pictures in the several rows may be formed into a continuous straight series by cutting either the positive or negative plate, between the rows, and placing the sections end to end. In like manner, the plate may be cut up into single negatives or positives which may be readily arranged in proper order to form a single continuous uninterrupted series, showing the appearance or variations of form in a moving object during a given portion of time.

When a plate has been exposed, the apparatus is prepared to expose another plate by rewinding the curtain upon the roll E, and applying a sensitized plate or other suitable surface behind the series of lenses.

The camera may be supported or held in any convenient manner, part of a foot board F being shown in Fig. 3 to represent such support.

The apparatus is very compact and readily operated, and by having a series of double plate holders a series of plates may be exposed to the same or to different objects as fast as the curtain can be restored to the take-up roll E.

Any suitable means may be employed to facilitate the winding of the roll E at a speed more rapid than a simple crank would afford, but no such means is shown as its application would be obvious. Any suitable means beside the rotary fan may also be used to regulate the speed of the curtain when actuated by a spring roll D, and other means than the spring roll may, if desired, be used for moving the curtain past the lenses at the desired speed.

The rotary fan is shown mounted, with the smaller gear $n$, removably upon a stud $n'$; and it is obvious that such construction permits the substitution of a fan of different dimensions which would be adapted to produce a different speed in the curtain, and the rotary fan thus furnishes a convenient means of varying the speed as may be required.

Having thus set forth the nature of my invention, what I claim herein is—

The camera shutter comprising a curtain having a series of apertures arranged diagonally therein, and means for operating the same to expose different rows of lenses in a camera successively, substantially as herein set forth.

In testimony whereof I have hereunto set my hand in the presence of two subscribing witnesses.

JAMES E. BLACKMORE.

Witnesses:
L. LEE,
THOMAS S. CRANE.